United States Patent [19]
Rinio

[11] 3,916,487
[45] Nov. 4, 1975

[54] CABLE HAULING DEVICE

[76] Inventor: Johannes Augustus Rinio, Altenberger-Dom-Strasse 18, 5074 Odenthal, Germany

[22] Filed: Oct. 3, 1973

[21] Appl. No.: 403,166

[30] Foreign Application Priority Data
Oct. 6, 1972 Germany............................ 2249127

[52] U.S. Cl. ............... 24/122.6; 24/134 N; 254/76; 57/144 J; 57/145; 57/148
[51] Int. Cl.².................... F16G 11/10; A01D 37/02
[58] Field of Search ......... 24/134 N, 122.6; 254/76; 57/144 J, 145, 146, 148, 149

[56] References Cited
UNITED STATES PATENTS

| | | | |
|---|---|---|---|
| 429,005 | 5/1890 | Bird | 57/148 |
| 1,046,330 | 12/1912 | Reeves | 24/134 N |
| 2,087,649 | 7/1937 | Magee | 24/134 N |
| 2,357,733 | 9/1944 | Guderian | 24/122.6 |
| 2,384,038 | 9/1945 | Larkin | 57/148 |
| 2,991,615 | 7/1961 | Stanton | 57/144 |
| 2,995,339 | 8/1961 | Persiaux | 254/76 |
| 3,197,953 | 8/1965 | Dawbarn | 57/144 |
| 3,485,478 | 12/1969 | Desplats | 24/134 N |
| 3,686,855 | 8/1972 | Falcy | 57/145 |
| 3,702,689 | 11/1972 | Zeller | 24/134 N |
| 3,778,993 | 12/1973 | Glusako | 57/145 |

*Primary Examiner*—Bernard A. Gelak
*Attorney, Agent, or Firm*—John J. Dennemeyer

[57] ABSTRACT

A cable hauling device comprises two pairs of clamp jaws which are movable in opposite directions. Alternately one pair of clamp jaws is clamped on a four-strand cross-twisted cable while the other pair of clamp jaws is displaced on the cable.

4 Claims, 2 Drawing Figures

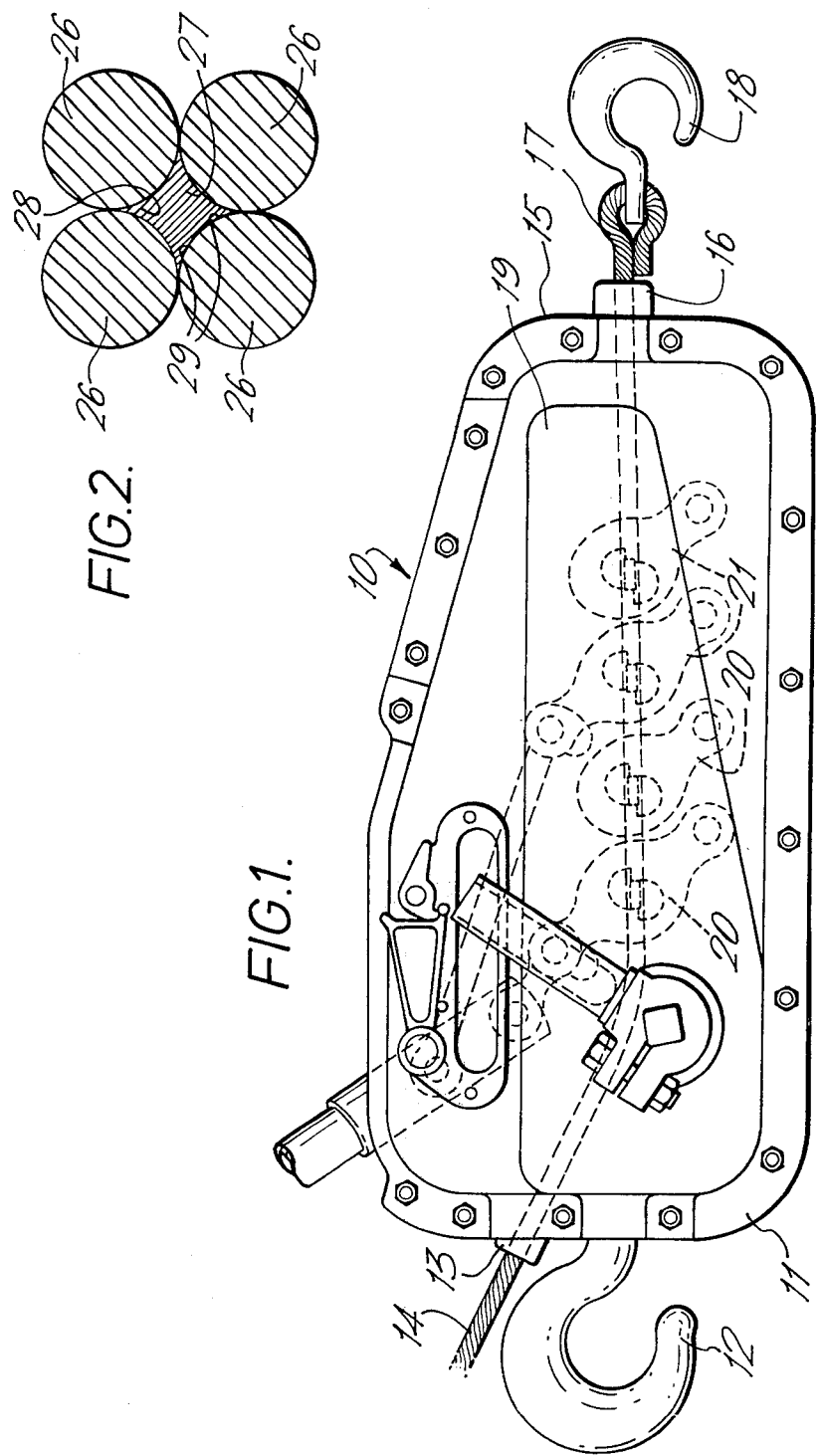

CABLE HAULING DEVICE

The invention relates to a cable hauling device to pull and release a wire cable of unlimited length, comprising two pairs of clamp jaws movable in opposite directions, wherein alternately one pair of clamp jaws is clamped on the cable to be pulled or released, while the other pair of clamp jaws is displaced freely on the cable.

In the known cable hauling devices of this type wire cables of different construction have been used until now, which were similar in the fact that, corresponding to most of the known wire cables for other purposes, they consisted of six strands twisted about a steel or fiber core. These cables have the disadvantage of a substantial tendency to turn, which results in an undesired oscillation of suspended loads. In addition cables with a fiber core were considerably deformed by the pressure of the clamp jaws in the hauling device. Although the cables provided with a steel core have suffered less deformation from the pressure of the clamp jaws, the untwisting which took place resulted in basket formations (upsetting of the strands) and in a premature rupture of the steel core. Deformations such as basket formations resulted necessarily in operating troubles of the hauling device, with a corresponding increase in the risk of accidents which is always present during the operation of lifting devices.

The object of the invention is to avoid these disadvantages and to provide a cable hauling device of the type described above comprising a cable which has a favorable response to rotation and a high form stability, and which maintains a constant diameter over a long period of time.

This object is obtained according to the invention by the use of a four-strand cross-twisted cable.

The four-strand cross-twisted cable has only a slight tendency to turn under load. If a small turning occurs, it is not harmful because the four strands arranged in a single strand position cannot untwist themselves. The cable cannot be deformed and therefore it does not block the passage through the cable hauling device between its two pairs of clamp jaws. Even if some small untwisting of the four-strand cable should occur, the cable returns to its initial position after the load is removed, because this is the stablest equilibrium position for the cable.

The four-strand cables used according to the invention have the same metallic cross-section as the six-strand cables of the same diameter used prior to this invention. The strands of a four-strand cable are therefore thicker than the strands of a corresponding cable with a higher number of strands. They have therefore also a greater form stability, i.e., they are more resistant to basket formation.

According to the invention the four strands of the cable are appropriately twisted around a solid cable core having a substantially square-shaped cross-section. Such a solid cable core is very small and practically non-compressible in a four-strand cable, because it is enclosed on all sides by the four strands of the cable and practically cannot yield sideways. In view of this it is not only possible to maintain the cable diameter with high accuracy during manufacture, but it also remains constant for a very long period of time during use under the influence of the transverse pressure exerted on the cable by the pairs of clamp jaws.

The cable core consists preferably of polypropylene. This plastic material has a close-grained structure and is highly resistant to wear, but it is deformable to a sufficient degree that the four strands of the cable are pressed into the side faces of the cable core and that its edges can press into the grooves between the strands. In this way the cable core completely fills the entire cavity between the four strands of the cable.

The four strands of the cable may be round or oval-shaped.

The invention will now be described in greater detail by referring to an embodiment shown in the drawing, wherein:

FIG. 1 shows a diagrammatic side view of a cable hauling device comprising clamp jaws, and FIG. 2 shows a four-strand wire cable according to the invention in cross-section.

In the drawings, numeral 10 designates a cable hauling device having a housing 11 in which a pin hook 12 is attached at one side. A wire cable 14 passes into the device 10 at the end 15 of the housing 11 through a cable inlet bushing 16, and leaves the housing at the opposite end through a bushing 13 disposed adjacent the pin hook 12. The load is suspended on a load hook 18 fixed at the end 17 of the cable 14.

On the inside of the housing 11 two pairs of clamp jaws 20 and 21 are provided which travel on the wire cable 14 and are driven by a crank shaft drive (not shown) through linkage means alternately in opposite directions in such a way that one pair of clamp jaws grips the traction cable while the other pair of clamp jaws slides along the cable. With each reciprocating movement of the crank shaft drive the grip of the pairs of clamp jaws changes, which results in a continuous movement of the wire cable 14 toward the pin hook 12. Such a cable hauling device is known and described for example, in German Pat. No. 840,586.

The steel cable 14 which is utilized according to the invention in the cable hauling device 10 is shown in FIG. 2. It consists of four strands 26 which are cross-twisted about a cable core 27. The cable core 27 consists of polypropylene and has an initially square-shaped cross-section. During the assembly of the cable the strands 26 are pressed into the side surfaces of the square-shaped cable core 27 so that they closely engage the core, and the edges 28 of the core 27 are pressed into the wedges 29 between the strands 26.

In the embodiment illustrated the strands 26 have a round cross-section. They may, however, be formed also as oval-shaped strands.

What is claimed is:

1. In combination:
   a. a four-strand cross-twisted cable wherein the four strands (26) of the cable (14) are twisted about a solid cable core (27) which has a substantially square-shaped cross-section and is practically non-compressible and
   b. a cable hauling device for pulling and releasing said four-strand cross-twisted cable, said cable hauling device comprising at least two oppositely movable pairs of clamp jaws wherein alternately one of the two pairs of clamp jaws is clamped on the cable while the other pair of clamp jaws is freely displaced on the cable.

2. The combination according to claim 1, wherein the cable core (27) consists of polypropylene.

3. The combination according to claim 2, wherein the four strands (26) of the cable (14) are round.

4. The combination according to claim 2, wherein the four strands (26) of the cable (14) are oval-shaped.

* * * * *